United States Patent [19]

Narayan et al.

[11] Patent Number: 4,743,627

[45] Date of Patent: May 10, 1988

[54] LIQUID ISOCYANURATE-MODIFIED POLYMETHYLENE BIS(PHENYLISOCYANATE) COMPOSITIONS CONTAINING A HIGH TWO-RING METHYLENE BIS(PHENYLISOCYANATE) CONTENT

[75] Inventors: Thirumurti Narayan, Grosse Ile; Peter T. Kan, Plymouth, both of Mich.

[73] Assignee: BASF Corporation, Parsippany, N.J.

[21] Appl. No.: 95,679

[22] Filed: Sep. 14, 1987

[51] Int. Cl.$^4$ ............................................. C08G 18/14
[52] U.S. Cl. ............................. 521/160; 252/182.21; 544/180; 544/193
[58] Field of Search ................ 521/160; 544/180, 193; 252/182

[56] References Cited

U.S. PATENT DOCUMENTS

| | | | |
|---|---|---|---|
| 4,148,980 | 4/1979 | Narayan | 521/115 |
| 4,243,756 | 1/1981 | Cenker et al. | 521/125 |
| 4,284,730 | 8/1981 | Narayan et al. | 521/125 |
| 4,382,125 | 5/1983 | Narayan et al. | 521/160 |

*Primary Examiner*—Maurice J. Welsh
*Attorney, Agent, or Firm*—Bill C. Panagos; Joseph D. Michaels

[57] ABSTRACT

A method for producing liquid isocyanurate modified Polymeric MDI composition containing a high two-ring MDI content, and foams made therefrom is described. The method comprises trimerizing a polymeric MDI in the presence of catalytically effective amount of a trimerization catalyst to form an isocyanurate containing polyisocyanate having a viscosity of about 100,000 mPas. The trimerization catalyst is thereafter deactivated and the isocyanurate-modified polyisocyanate is blended with a methylene bis(phenylisocyanate) (MDI) to form a final product having a two-ring content of about 60 percent of the total ring content and a viscosity comparable to polymeric MDI. Foams produced using this liquid isocyanurate modified polymeric MDI are of a substantially lighter color than those produced from standard polymeric MDI.

8 Claims, No Drawings

LIQUID ISOCYANURATE-MODIFIED POLYMETHYLENE BIS(PHENYLISOCYANATE) COMPOSITIONS CONTAINING A HIGH TWO-RING METHYLENE BIS(PHENYLISOCYANATE) CONTENT

BACKGROUND OF THE INVENTION

1. Field of the Invention

This invention relates to liquid isocyanurate-modified polymeric methylene bis(phenylisocyanate) (PMDI) compositions having high two-ring methylene bis(phenylisocyanate) (MDI) content and a viscosity comparable to standard PMDI.

This invention also relates to liquid isocyanurate-modified PMDI compositions which are useful in making rigid packaging foams which are of a substantially lighter color than those prepared from standard PMDI.

2. Description of the Material Art

Narayan et al, U.S. Pat. No. 4,382,125, disclose the production of a isocyanurate-modified PMDI compositions, and a foam made therefrom. There is no teaching in Narayan et al of mixing an isocyanurate-modified PMDI composition with a two-ring methylene bis(phenylisocyanate) (MDI) composition to give a viscosity of about 150 to 2000 mPas and a two-ring MDI content of at least 60 percent.

Narayan et al, U.S. Pat. No. 4,284,730, disclose liquid carbodiimide, uretonimine and isocyanurate containing isocyanate compositions and microcellular foams made therefrom. There is no teaching in Narayan et al of the mixing of PMDI composition with a two-ring MDI to achieve a viscosity of about 150 to 2000 mPas, and a relatively high two-ring MDI content which is suitable for making packaging foams having a lighter color than was possible using the isocyanurate compositions of the prior art.

Narayan U.S. Pat. No. 4,148,980, discloses novel carboxylate catalysts for the preparation of foams characterized by isocyanurate, urethane and urethane-isocyanurate linkages. This reference is material only in that it discloses some of the trimerization catalysts which are useful in the preparation of the isocyanurate-modified PMDI materials of the present invention.

Cenker et al, U.S. Pat. No. 4,243,756, disclose a stable liquid isocyanurate-modified polyisocyanate composition which is prepared by reacting organic polyisocyanates in the presence of catalytic amounts of alkali metal or alkaline earth metal organo-hydroxyamates or the metal salt-free acid complex of these materials at temperatures of from about 25° C. to about 250° C. There is no showing in Cenker et al of mixing the isocyanurate-modified polyisocyanate compositions formed thereby with a two-ring MDI composition to form an isocyanurate-modified polyisocyanate mix having a relatively high two-ring MDI content and a viscosity of about 150 to 2000 mPas.

SUMMARY OF THE INVENTION

The present invention is concerned with highly stable, liquid PMDI compositions having high two-ring content and relatively higher viscosity and to a unique method for the preparation thereof. The polyisocyanates of the present invention are useful in producing all varieties of polyurethane products, such as e.g., rigid and flexible foams, coatings, elastomers and sealants. More particularly, these polyisocyanates are useful in the preparation of light color packaging foams as compared to traditional PMDI having the same viscosity.

DETAILED DESCRIPTION OF THE PREFERRED EMBODIMENT

There are a variety of applications where high two-ring containing and high isocyanate content PMDI products having a viscosity comparable to standard polymeric MDI are required. Generally, the viscosity of the isocyanate products may be increased by adding non-reactive additives or reacting with polyols to produce a prepolymer. Both these approaches have drawbacks. The nonreactive additive does not bond reactively to the final end product and is detrimental to the strength properties of the product.

The prepolymer preparation by reacting with a polyol substantially lowers the isocyanate content of the product. The present invention relates to unique isocyanate compositions. These isocyanates are PMDI based and contain isocyanurate linkages and a high two-ring MDI content. The polyisocyanates of the present invention are useful in the preparation of flexible and rigid foams, and particularly lighter colored foams compared to those based on standard polymeric MDI. Although these compositions contain more than 60 percent of two-ring MDI, the viscosity of the composition is comparable to standard polymeric MDI.

The stable isocyanurate-modified PMDI composition of the present invention is prepared by the trimerization in the presence of an effective amount of a trimerization catalyst, of a PMDI to the extent that the conversion to isocyanurate based on the isocyanate content is from about 5 to 50 percent by weight, and the viscosity in mPas at 25° C. is from about 5000 to 200,000. After the deactivation of the trimerization catalyst, the isocyanurate-modified polyisocyanate is mixed with standard two-ring MDI. The isocyanates of the present invention are useful in the preparation of flexible and rigid foams, and particularly light colored foams when compared to those based on normal polymeric MDI. Although the compositions contain at least about 60 percent MDI, the viscosities are comparable to standard polymeric MDI i.e. from about 150 to 2000 mPas.

That portion of the polyisocyanate which is trimerized is characterized by the presence of the isocyanurate radical in its structure, and in its simplest form may be represented by the formula OCN—R—NCO     Solvent Trimerization Catalyst

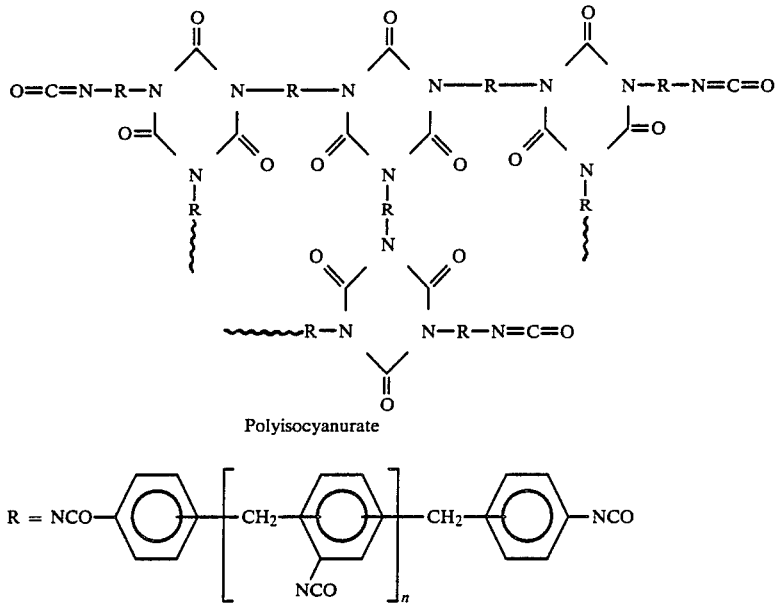

Polyisocyanurate $R =$ [structure: NCO-phenyl-[CH₂-phenyl(NCO)]ₙ-CH₂-phenyl-NCO]

n is 0,1,2,3,4 ... etc.

The products of this invention, however, may be complex mixtures in which trimerized and untrimerized molecules are present and thereby we do not wish to be bound by the structures exemplified above.

The liquid isocyanurate-modified polyisocyanate compositions of the present invention may be prepared by employing well known compounds as trimerization catalysts. Examples of suitable catalysts include (a) organic strong bases, (b) tertiary amine co-catalyst combinations, (c) Friedal Crafts catalysts, (d) basic salts of carboxylic acids, (e) alkali metal oxides, alkali metal alcoholates, alkali metal phenolates, alkali metal hydroxides and alkali metal carbonates, (f) onium compounds from nitrogen, phosphorus, arsenic, antimony, sulfur and selenium, and (g) monosubstituted monocarbamic esters. These include 1,3,5-tris(N,N-dialkylaminoalkyl)-s-hexahydrotriazines; the alkylene oxide and water or carboxylic acid adducts of 1,3,5-tris(N,N-dialkylaminoalkyl)-s-hexahydrotriazines; 2,4,6-tris(-dimethylaminomethylphenol); ortho-, para- or a mixture of o- and p-dimethylaminomethylphenol and triethylenediamine or the alkylene oxide and water carboxylic acid adducts thereof, metal carboxylates such as lead octoate, sodium and potassium salts of octano hydroxamic acid, and organic boron containing compounds. Monofunctional alkanols containing from 1 to 24 carbon atoms, epoxides containing 2 to 18 carbon atoms and alkyl carbonates may be used in conjuction with tertiary amines to accelerate the rate of polymerization reaction. The catalysts are present in a catalytically effective amount. Preferably, the concentration of trimerization catalysts that may be employed in the present invention is from about 0.001 part to 20 parts of catalyst per 100 parts of organic polyisocyanate. The temperature ranges which may be employed for the trimerization reaction may be in the range of from about 25° C. to about 230° C., and preferably from about 25° C. to 120° C.

The trimerization catalysts are deactivated after substantially all of the desired polyisocyanate is reacted to form an isocyanurate linkage. The trimerization catalysts are deactivated by the employment of an acid or an acid chloride. The acids may be selected from the group consisting of hydrochloric acid, sulfuric acid, acetic acid, oxalic acid, phosphoric acid, methanesulfonic acid, trifluoromethanesulfonic acid, benzene-, toluene- or xylene sulfonic acids, acid chlorides such as acetyl or benzoyl chloride, and sulfonyl chlorides such as benzene, toluene or xylenesulfonyl chloride, and mixtures thereof may be employed. Another series of deactivators which are alkylating agents such as dimethyl sulfate, o- or p-alkyl toluene sulfonates, and methyl chloride may also be employed. The isocyanurate-modified standard product has a viscosity of about 100,000 mPas. This is blended with two-ring MDI such as 4,4'-MDI, or mixtures of 2,2'-MDI, 4,4'-MDI, which achieves a two-ring content in the final product of at least about 60 percent of the total ring content and yet maintains the viscosity of the composition at about 150 to 2000 mPas. The isocyanate content is comparable to standard polymeric MDI.

It has been surprisingly found that another advantage of the present invention is that by blending a two-ring MDI into the modified isocyanurate, it is possible to use this material to form a lighter colored foam which is useful in foam packaging applications. The foams may be prepared as is known in the art by the catalytic reaction of the isocyanurate-modified polyisocyanate with a polyol in the presence of blowing agents, surfactants and the other additives which may be deemed necessary. Noncellular products may also be prepared in the absence of blowing agents as is well known in the art.

The rigid or flexible foams may be prepared as is conventional in the art by reacting the polyisocyanate composition in the present invention with an active hydrogen compound in the presence of blowing agents, surfactants and optionally crosslinking agents.

Typical polyols which may be employed in the preparation of foams of the present invention include polyhydroxyl-containing polyesters, polyoxyalkylene polyether polyols, polyhydroxy-terminated polyurethane polymers, polyhydroxyl-containing phosphorous compounds, and alkylene oxide adducts of polyhydric sulfur-containing esters, polyacetals, aliphatic polyols or diols, ammonia, and amines including aromatic, aliphatic and hetrocyclic amines as well as mixtures thereof. Alkylene oxide adducts of compounds which contain two or more different groups within the above defined classes may also be used such as amino alcohols which contain an amino group and a hydroxyl group. Also, alkylene oxide adducts of groups which contain one SH group and one OH group as well as those which contain an amino group and a —SH group may be used. Generally the equivalent weight of the polyols will vary from about 100 to 10,000 and preferably from about 1000 to 3000.

Any suitable hydroxy-terminated polyester may be used such as are obtained, for example, from the reaction of polycarboxylic acids and polyhydric alcohols. Any suitable polycarboxylic acids may be used such as oxalic acid, malonic acid, succinic acid, glutaric acid, adipic acid, palmitic acid, suberic acid, azelaic acid, subesic acid, bymilic acid, thesbic acid, maleic acid, fumaric acid, itaconic acid, alpha-hydromutonic acid, beta-butyl, alpha-ethyl-glutaric acid, alpha, beta-diethyl succinic acid, isophthalic acid, terephthalic acid, hemimaletic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptane-diol, glycerol, 1,1,1-trimethylol-propane, 1,1,1-trimethylol-ethane, 1,2,6-hexanetriol, alpha-methyl glucocide, pentaerythitol, and sorbitol. Also included within the term "polyhydric alcohol" are compounds derived from phenol such as 2,2 bis(4-hydroxyphenyl)propane, commonly known as bis-phenol-A.

Any suitable polyoxyalkylene polyether polyol may also be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide tetrahydrofuran mixtures; epihalohydrins such as epihalohydrin; as well as arylalkylene oxide such as styrene oxide. The polyalkylene polyether polyols may have either primary or secondary hydroxyl groups. Included among the polyether polyols of polyoxyethylene glycol, polyoxypropylene glycol, polyoxybutylene glycol, polytetramethylene glycol, block copolymers, for example, combinations of polyoxypropylene and polyoxyalkylene glycols, ethylene glycols, poly-1,2-oxybutylene and polyoxyethylene glycols, poly-1,4-tetramethylene and polyoxyethylene glycols, and copolymer glycols prepared from blends as well as sequential addition of two or more alkylene oxides. The polyalkylene polyether polyols may be prepared by any known process such as, for example, the process described by Würtz in 1859 in *Encyclopedia of Chemical Technology*, vol. 7, page 257–262, published by Interscience Publishers, Inc. (1951) or in U.S. Pat. No. 1,922,459. Suitable polyhydric polythioethers which may be condensed with alkylene oxide include the condensation product of thiodiglycol or the reaction product of dicarboxylic acid such as is disclosed above for the preparation of the hydroxyl-terminated polyesters with any other suitable thioether glycol. The hydroxyl-containing polyesters may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyesters with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those discussed above.

Suitable aliphatic thiols which may be condensed with alkylene oxides include alkylene thiols containing at least two —SH groups such as 1,2-ethanedithiol, 1,2-propanedithiol, and 1,6-hexanedithiol; alkylene thiols such as 2-butene-1,4-dithiol; and alkane thiols such as 3-hexane-1,6 dithiol.

Suitable amines which may be condensed with alkylene oxides include aromatic amines such as aniline, o-chloroaniline, p-aminoaniline, 1,5-diaminonaphthalene, methylene dianiline, and the condensation products of aniline and formaldehyde, and diaminotoluene; aliphatic amines such as methylamine, tris-isopropyl amine, ethylene diamine, 1,3-diaminopropane, 1,3-diaminobutane, and 1,4-diaminobutane.

Polyurethane foams may also be prepared by reacting organic polyisocyanates with graft polymer polyol in the presence of a blowing agent and optionally in the presence of additional polyhydroxyl-containing components, chain extending agents, catalysts, surface active agents, stabilizers, dyes, fillers and pigments. Suitable processes for the preparation of cellular polyurethane products are disclosed in U.S. Pat. No. Re. 24,514 together with suitable machinery to be used in conjunction therewith. For the preparation of microcellular foams, blowing agents are generally not necessary. If desired for more expanded foams, they may be employed. When water is used, corresponding quantities of excess isocyanate to react with the water and produce carbon dioxide are necessary.

It is possible to proceed with the preparation of the polyurethane products by a prepolymer technique wherein an excess of the modified organic polyisocyanate is reacted in the first step with a polyol to prepare a prepolymer having free isocyanate groups which is then mixed with a polymeric MDI having a two-ring content, to result in a organic isocyanate having a two-ring content of about 60 percent and a viscosity of about 200 mPas. The prepolymer is reacted in the second step with a polyol or an amine and a blowing agent such as water or fluorocarbon to prepare a foam. The foam so made is of a lighter color than is achievable by using the organic isocyanates of the prior art and particularly the polymeric MDI foams. Furthermore, instead of water, low boiling hydrocarbons such as pentane, hexane, heptane, and azo compounds such as azohexahydrobenzyldinitrile; halogenated hydrocarbons such as dichlorodifluoromethane, trichlorofluoromethane, dichlorodifluoroethane, trichlorotriflouroethane, vinyledene chloride, and methylene chloride may be used as blowing agents.

Chain extending agents which may be employed in the preparation of the polyurethane foams include both compounds having at least two functional groups bearing active hydrogen atoms such as water, hydrazine, primary and secondary diamines, amino alcohols, amino acids, hydroxy acids, glycols, and mixtures thereof. The preferred group of chain extending agents includes water, ethylene glycol, 1,4-butanediol, and primary and secondary diamines which react more readily with the polyisocyanate than does water. These include phenylenediamine, ethylenediamine, diethylene triamine, N-(2-hydroxypropyl)ethylenediamine, N,N'-di(2-hydroxypropylethylenediamine), piperazine, and 2-piperazine. Any suitable catalyst for the polyurethane formation may be used including tertiary amines such as, for example, triethylenediamine, N-methyl morpholine, N-ethyl morpholine, diethylaminoethanol, N-lauryl morpholine, 1-methyl-4-(dimethylaminoethyl)piperazine, 3-methoxy-N,N'dimethylpropylamine, N,N,N'-trimethylisopropyl propylene diamine, N,N,N',N'-tetraethylpropylenediamine, dimethylbenzylamine, and mixtures thereof.

Other suitable catalysts are, for example, tin compounds such as stannous chloride, tin salts of carboxylic acids, such dibutyltin di-2-ethylhexanoic and stannous octoate, as well as other organo metallic compounds such as are disclosed in U.S. Pat. No. 2,846,406 incorporated herein by reference.

If desired, a surface active agent may be employed. Numerous surface active agents have been found satisfactory. Nonionic surface active agents are preferred.

Of these, the nonionic surface active agents prepared by the sequential addition of propylene oxide and then ethylene oxide to propylene glycol in the solid or liquid organo silicones have been found particularly desirable. Other surface active agents which are operative, although not preferred, include polyethylene glycol ethers of long chain alcohols, tertiary amine or alkanol amine salts of long chain alkyl acid sulfate esters, alkyl sulfonic esters, and alkyl aryl sulfonic acids.

The suitable MDIs which may be used in mixing with the present invention to obtain the PMDI compositions with isocyanurate linkages and high two-ring MDI content are the two-ring MDI compounds such as 4,4'-methylene bis(phenylisocyanate), and mixtures of 4,4'-methylene bis(phenylisocyanate) and 2,4'-methylene bis(phenylisocyanate). Other modified diisocyanates such as uretonimine, biuret or allophanate modified isocyanates may be employed.

The following examples are offered to illustrate various aspects of the invention. Those skilled in the art understand that there are many possible modifications and the examples are not to be construed as limiting the scope and spirit of the invention.

EXAMPLE 1

Example 1 depicts the preparation of (PMDI) containing isocyanurate linkages.

Three thousand six hundred parts of PMDI having a viscosity of 190 mPas at 25° C. were charged into a reaction vessel equipped with a stirrer and heating means. The entire reaction was conducted under an inert atmosphere such as nitrogen with continuous agitation of the reaction contents. Six parts of 1,3,5-tris(-dimethylaminopropyl)-s-hexahydrotriazine (TDH) was added to the polyisocyanate. An exothermic reaction was noted, the temperature generated being from 25° to 28° C. Thereafter, the reaction contents were heated at about 60° to 65° C. for three hours. At the end of the three hours, 6 parts of benzoyl chloride were added to deactivate the catalyst. The isocyanurate content of the product was 27.07. The infrared spectrum of the product indicated the presence of isocyanurate rings.

The above isocyanurate-containing PMDI were divided into five portions and blended with two-ring isocyanates to obtain the desired viscosity and two-ring content. The data of the blending are shown in Table I and Table II.

TABLE I

| | MODIFIED POLYMERIC MDI | | | | | | |
| | | | Example | | | | |
| Isocyanate | 2 | 3 | 4 | 5 | 6 | Isocyanate A | Isocyanate B |
|---|---|---|---|---|---|---|---|
| Iso of Ex. 1, % | 50 | 50 | 50 | 50 | 50 | — | — |
| 4,4'-MDI, % | 50 | — | 20 | 35 | 30 | — | — |
| 50/50 4,4'/2,4'-MDI, % | — | 50 | 30 | 15 | 10 | — | — |
| Uretonimine modified MDI, % | — | — | — | — | 10 | — | — |
| Properties | | | | | | | |
| NCO, % | 30.3 | 30.4 | 30.4 | 30.5 | 30.1 | 30–32 | 30–32 |
| Visc., 6 mPas/25° C. | 183 | 190 | 202 | 190 | 218 | 170–190 | 50–80 |
| HPLC Analysis, wt % | | | | | | | |
| 4,4'-MDI, % | 59.0 | — | — | — | — | — | — |
| 2,4'-MDI, % | 1.9 | — | — | — | — | — | — |
| total 2-ring MDI | 60.9 | — | — | — | — | 44–46 | 60–65 |
| 3-ring MDI | 6.4 | — | — | — | — | — | |
| Storage for 6 mo. at 25° C. | stable | stable | stable | stable | stable | stable | stable |
| Storage for 2 wks. at 0° C. | — | stable | stable | — | stable | stable | — |
| Foam color | light | light | light | light | light | dark | dark |

Isocyanate A Standard viscosity PMDI
Isocyanate B Low viscosity PMDI

Examples outlined in Table II are comparative examples which illustrate the preparation of the stable compositions of the present invention by using the process of the invention. Examples 7 and 8 illustrate that stable isocyanate products cannot be obtained by preblending the two-ring MDI and subsequent isocyanuratization.

TABLE II

| Materials | Example 7 | Example 8 |
| --- | --- | --- |
| PMDI, parts | 50 | 50 |
| 4,4'-MDI, parts | 50 | 45 |
| 2,4'-MDI, parts | — | 5 |
| TDH,* parts | 0.083 | 0.083 |
| Benzoyl chloride | 0.083 | 0.083 |
| Properties | | |
| NCO, % | 29.0 | 29.5 |
| Viscosity, mPas/25° | 431 | — |
| Storage stability at 25° C. | solid sediment in 1 hour | solid sediment in 1 hour |

*1,3,5-tris (N,N—dimethylaminopropyl)-s-hepahydrotriazine

The embodiments of the invention in which an exclusive property or privilege is claimed are defined as follows:

1. A method for the preparation of a highly stable liquid isocyanurate-containing polyisocyanate composition containing a high two-ring methylene bis(phenylisocyanate) content, comprising:
   (a) trimerizing polymeric MDI in the presence of a catalytically effective amount of a trimerization catalyst to effect the conversion of isocyanate to isocyanurate to form an isocyanurate-containing polyisocyanate;
   (b) deactivating the trimerization catalyst; and,
   (c) blending the isocyanurate-containing polyisocyanate with a methylene bis(phenylisocyanate) to form a final product having a viscosity comparable to standard viscosity polymeric MDI and a two-ring content of at least about 60 percent by weight of the composition,
whereby the final product is useful in the preparation of lighter colored foams, than those possible with standard polymeric MDI.

2. The method of claim 1 wherein the product of (a) has a viscosity at 25° C. of about 5,000 mPas to 200,000 mPas.

3. The method of claim 1 wherein the product of (c) has a viscosity of about 150 mPas to 2000 mPas.

4. The method of claim 1 wherein the methylene bis(phenylisocyanate) is selected from the group consisting of 2,2'-methylene bis(phenylisocyanate), 2,4'-methylene bis(phenylisocyanate), 4,4'-methylene bis(phenylisocyanate)uretonimine modified methylene bis(phenylisocyanate) and mixtures thereof.

5. The method of claim 1, wherein the methylene bis(phenylisocyanate) is a blend comprised of about 0–100% 4,4'-methylene bis(phenylisocyanate), about 0–10% of 2,2'-methylene bis(phenylisocyanate), and about 0–50% of 2,4'-methylene bis(phenylisocyanate), and, about 0–50% of uretonimine modified methylene bis(phenylisocyanate) whereby the total amount of the two ring MDI of the composition is at least about 60% of the total ring content.

6. A flexible or rigid, light colored foam comprising reacting a blend of an isocyanurate modified-Polymeric MDI and a methylene bis(phenylisocyanate), blowing agents, an active hydrogen compound and surfactants.

7. The foam of claim 6, further including crosslinking agents.

8. A method for the preparation of a highly stable liquid isocyanurate-containing polyisocyanate composition containing a high two-ring methylene bis(phenylisocyanate) content, comprising blending an isocyanurate-containing polyisocyanate with a methylene bis(phenylisocyanate) to form an isocyanurate-containing polyisocyanate having a viscosity comparable to standard viscosity polymeric MDI and a two-ring content of at least about 60 percent by weight of the composition.

* * * * *